May 14, 1940.  R. W. MOORE  2,201,049

GLASS FABRICATION PROCESS AND MOLD

Filed Oct. 13, 1939

Inventor:
Roy W. Moore,
by Harry E. Dunham
His Attorney.

Patented May 14, 1940

2,201,049

UNITED STATES PATENT OFFICE 2,201,049

GLASS FABRICATION PROCESS AND MOLD

Roy W. Moore, Schenectady, N. Y., assignor to General Electric Company, a corporation of New York Application October 13, 1939, Serial No. 299,296

8 Claims. (Cl. 49—65)

The present invention is a continuation-in-part of my prior application Serial No. 188,091, filed February 1, 1938, and relates to the art of casting fused vitreous material, such as various glass compositions, including thereby also fused silica and alumina.

Heretofore, considerable difficulty has been involved in forming glass articles by any process which involved casting molten glass into a mold, or other receiving means, because of the sticking of the molten glass at casting temperatures to any solid surfaces with which it came into contact. This made it difficult or impossible to separate the solidified glass from the mold or other receiving device. In glass casting the glass must be highly heated in order to secure the required fluidity. At high temperatures molten glass sticks to surfaces of materials which can be used satisfactorily for fabricating glass at lower temperatures at which glass still is plastic.

I have discovered that molten glass will not adhere to a boron nitride surface even when the glass is highly fluid, regardless of the temperature of the boron nitride surface.

My invention comprises both mold members which are coated with boron nitride and also the method of utilizing boron nitride to prevent the sticking of fluid glass to solid surfaces. One of the features of my invention comprises a method of fabricating glass articles by casting liquefied glass at temperatures higher than heretofore used in the fabrication of glass articles. One of the novel features of my invention is the superheating of the cast glass well above ordinary glass-working temperatures. My improved method also involves the fabrication of composite articles of glass and metal as will be hereinafter explained and defined by the accompanying claims.

Figure 1:
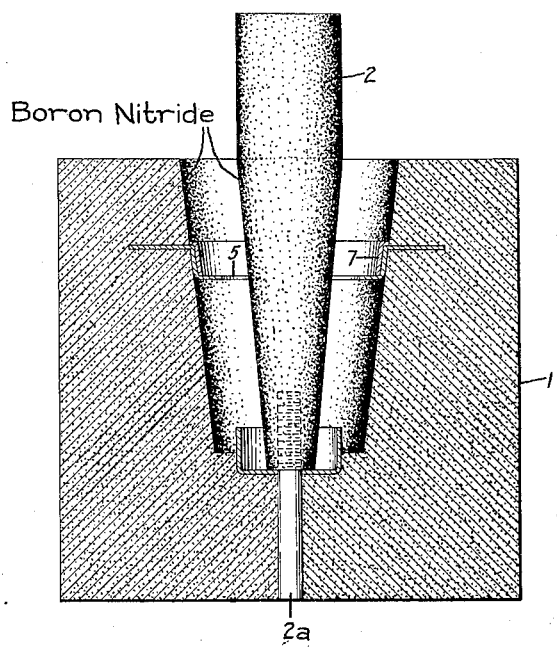
Figure 3:
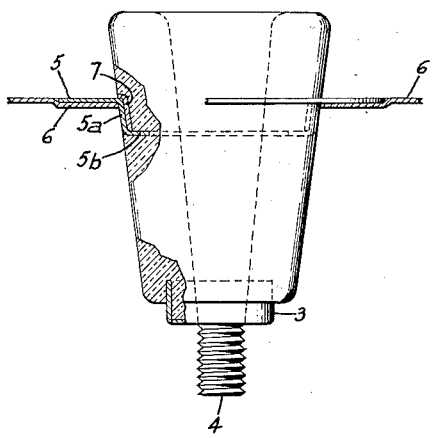
Figure 2:
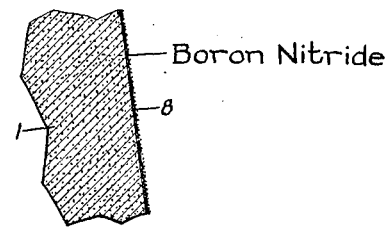

The accompanying drawing shows in Fig. 1 a vertical section of mold and core members assembled, (together with some metal inserts), in position to receive a charge of molten glass; Fig. 2 is a fragmental enlarged view of a portion of the core; and Fig. 3 shows a glass insulator produced in such mold, some attached parts being likewise shown.

The mold shown in section in Fig. 1 comprises a mold body or matrix 1 and a core 2 having a centering pin 2a. These parts should have a configuration adapted to form a glass article, for example, the insulator shown in Fig. 3. The mold members, including matrix and core, may consist of graphite or of a suitable refractory composition such as alumina, or a suitable ceramic material, or may consist of a suitable metal, such for example as iron, nickel, or their alloys; chromium, or its alloys; and the like.

To prevent adherence of the molten glass to the surfaces of the matrix and core these surfaces are provided with a thin layer of boron nitride, as indicated at 8 in Fig. 2. The boron nitride may be applied by rubbing it, brushing, or spraying it in finely-divided state with a carrier medium if desired on the surface to be coated, or by using a suitable temporary binder which can be volatilized before the casting operation. The utilization for glass casting of molds consisting wholly of boron nitride is not precluded, but such molds are relatively fragile and expensive.

It should be understood that this particular mold is shown merely for illustrative purposes as one of various forms of means for receiving molten glass. The cast glass may be set from fusion in the casting mold or may be further fabricated, while at lower temperature but still in the plastic state, by pressing in another mold. For example, a predetermined amount of molten glass may be introduced from the glass melting pot into a suitable receptacle lined with boron nitride and serving as a measuring device which preferably is heated. From this preliminary mold, the measured amount of glass, while still hot enough to be plastic, is transferred to a pressing mold or other fabricating device.

Insulators for use in electrical devices in some instances are provided with metal members or inserts to which the glass should adhere either externally, or which should be firmly embedded in the body of the cast glass, these members in either case forming an integral part of the cast object. For illustrative purposes, two such metal insert members have been shown. At the bottom of the cavity between the mold members is provided a cup-shaped member 3 consisting of suitable metal, such as nickel-iron alloy or iron-nickel-cobalt alloy.

As shown in Fig. 3, a threaded stud 4 is united subsequently by welding, soldering, or other means, to the cup-shaped member 3, or it may form part of the cup 3 before the latter is assembled in place in the casting mold. This stud 4 serves for making an electrical connection to one pole of an electrical device (not illustrated). A second metal insert 5 is embedded near the upper part of the glass insulator. This metal insert is later attached by welding, or otherwise, to a plate 6, as for example, the cover plate of a tank (not shown) containing the electrical device of which the insulator constitutes a part.

In carrying out my invention, glass of desired composition is fused in a suitable glass furnace and before casting is superheated above the temperatures ordinarily employed for the various glass operations, such as blowing, pressing, rolling, and the like, which require plasticity only in the glass being fabricated as contrasted with a high degree of fluidity or low viscosity. Ordinarily, furnace temperatures within a range of about 1300 to 1500° C. are sufficient, although some kinds of high melting glasses may require even higher temperatures. The superheated, highly fluid glass is poured or cast directly into chosen boron-nitride coated molds, preferably graphite molds, such, for example, as described in connection with Fig. 1. Preferably the molds are preheated to avoid chilling the fluid glass before it takes the form of the mold.

When a metal insert, such as member 3, is to be embedded in the cast glass, then the glass should be chosen to match to a substantial degree the thermal expansion and contraction characteristics of the metal insert at least in the range between normally encountered ambient temperatures and the softening temperature of the glass. Examples of suitably matched glass and metal combinations are disclosed in United States Letters Patent No. 2,071,196 of E. E. Burger and A. W. Hull. The surfaces of metal inserts to which sealing, or adhesion, of the glass is desired are left uncoated with boron nitride and the metal insert is held in such position in the mold that the superheated glass flows into contact with such surfaces.

In the pouring operation some cooling of the fluid glass occurs, but the cast glass when entering the mold should be at a temperature above 1000° C., and generally as high as 1200° C., or even higher in some cases. In exceptional cases when the glass is melted directly in the mold, the glass may be at temperatures as low as about 800° C. At these high temperatures, fluid glass will "wet" or adhere to all known solid materials, (assuming such materials to be non-decomposable), the only exception known to me being boron nitride.

The cast glass will "wet" and adhere to uncoated surfaces of inserts and later when solidified will continue to adhere so as to form an integral unit with the insert. Composite articles comprising metal and glass members can be fabricated by the casting method with such members in an inseparably united state, the glass being sealed to the metal with a tight bond. On the other hand, the glass when set from fusion, that is, solidified by cooling, may be easily removed from the boron-nitride coated mold surfaces.

The surfaces of glass which solidified in contact with boron nitride are smooth and free from embedded mold material. Superficially clinging boron nitride powder may be readily wiped off, leaving a clean glass surface. The molds may be employed for repeated casting operations.

In order to permit the metal insert 5 to expand and contract, due to heating and cooling, as when welded to the cover 6, without damage to the glass insulator, it is preferred that the glass should not adhere to the lateral part of metal insert labelled 5a. In order to prevent the glass from adhering to the surface of this portion 5a of the metal insert 5, a coating of boron nitride may be applied to such surface. Care must be exercised in that event to keep the embedded portion 5b free from boron nitride as adherence of the glass to the surface of portion 5b is desired. In some cases a ring 7 may be provided which lies snugly against the inner surface of the section 5a and reduces access of the molten glass to the section 5a. The construction of the metal inserts forms no part of my present invention. In application Serial No. 305,666, filed November 22, 1939 by Hull and Moore, are described and claimed composite articles which comprise a member of cast glass and a metal body at least partially embedded in and bonded thereto. Such articles are exemplified herein by the glass insulator or terminal bushings for an electric device which is shown in Fig. 3.

What I claim as new and desire to secure by Letters Patent of the United States is:

1. The step in the method of casting fluid glass into contact with a solid receiving surface to which glass will normally adhere which consists in interposing a layer of boron nitride between said receiving surface and said fluid glass.

2. The method of fabricating glass which consists in superheating said glass to a temperature of fluidity at which such glass has a low viscosity and materially higher than the temperature at which such glass is plastic, casting the fluid glass on a receiving surface comprising boron nitride, and causing said glass to set from fusion in contact with said surface.

3. The method of fabricating glass which consists in heating such glass to a temperature within a range of about 800 to 1200° C. to produce a fusion of low viscosity and shaping the glass while so heated in a mold surfaced with boron nitride.

4. The step in a method of fabricating glass articles which consists in casting glass while heated to a temperature at about 1200° C. into a graphite mold, the receiving surface of which is coated with boron nitride, whereby adhesion of the cast glass to said mold is prevented.

5. The method of fabricating articles consisting of metal and glass members which consists in placing a metal member in desired position in a mold, the receiving surfaces of which are coated with boron nitride, and casting glass heated to a temperature of at least about 1000° C. into said mold and in contact with said metal members.

6. The method of fabricating articles consisting of metal and glass members which consists in placing the desired metal member or members in a mold, casting glass heated to a temperature of at least about 1000° C. into said mold in contact with said metal members, preventing adhesion of the cast glass to the mold by interposing between the glass and the mold a layer of boron nitride, and permitting the glass to set from fusion in contact with said metal member or members in said mold.

7. A mold for receiving molten glass comprising a member having affixed to a receiving surface thereof a layer of boron nitride.

8. A carbon member for a mold receiving cast molten glass, said member being provided with a surface layer of boron nitride whereby adhesion of molten glass cast into contact with said member is prevented.

ROY W. MOORE.